Oct. 3, 1967   A. F. GEISINGER   3,344,592
WIRE TENSIONING DEVICE
Filed Dec. 30, 1965

INVENTOR.
ABEL F. GEISINGER
BY
J.B. Holden
ATTORNEY 3,344,592
WIRE TENSIONING DEVICE
Abel F. Geisinger, Akron, Ohio, assignor to The Goodyear Tire & Rubber Company, Akron, Ohio, a corporation of Ohio
Filed Dec. 30, 1965, Ser. No. 517,700
3 Claims. (Cl. 57—3)

This invention relates to a tensioning device, and in particular it relates to winding devices utilized in coiling wire onto or around cylindrical objects such as hoses or pipes. The wire tensioning apparatus as described herein is used in conjunction with other reinforcement dispensing machines such as textile wrappers or braiders.

It is known to make hoses wherein the walls are reinforced with a helically coiled wire. In the placement of the wire coils it is also known to use a guide means for the positioning of the wire in equally spaced convolutions. A means for tensioning the wire in past devices has relied upon a fixed adjustment such as a direct acting spring or friction set-screw arrangement.

It is the primary object of the present invention to provide a winding device for coiling wire at constant tension around a hose carcass.

An additional object of this invention is to provide a winding device that can accommodate long lengths of wire.

A further object of the invention is to provide a machine the operation of which requires little skill, can be rapidly adjusted, and is capable of high production rates.

These and other objects of the instant invention will become apparent from the following description and drawing in which.

Figure 2:
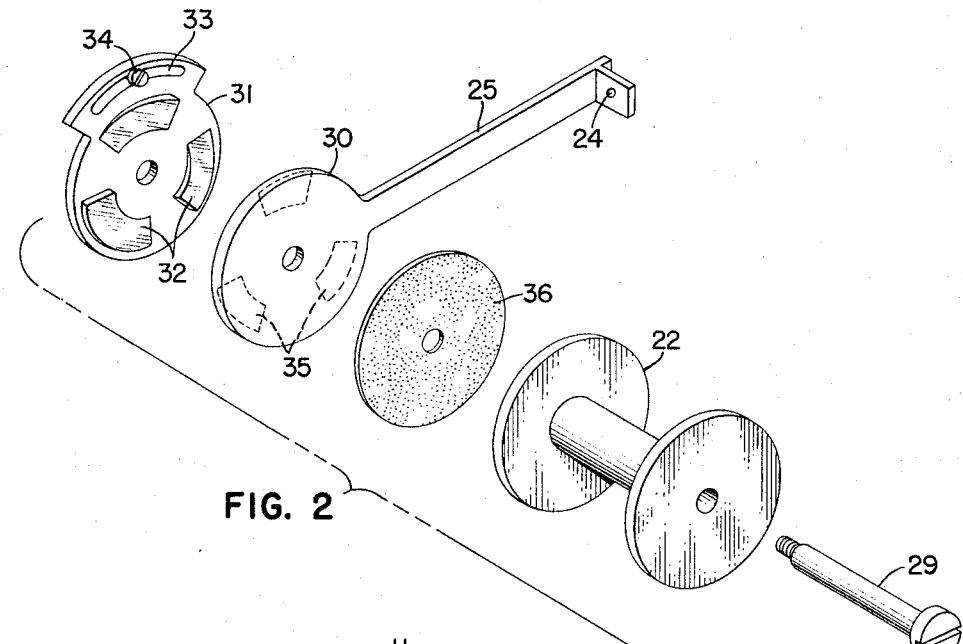
FIG. 2 is a broken-away perspective view of the constant tensioning device.

By utilizing the present invention, the spiral wire reinforcement placed in or around the hose carcass can be convoluted with equal tension along the entire length of the hose. A hose made according to the present invention has a uniform flexure and results in less movement of the reinforcement wires within the hose subsequent to and during the curing thereof. The apparatus which achieves this new and desirable result can best be described by referring to the drawings in detail.

Figure 1:
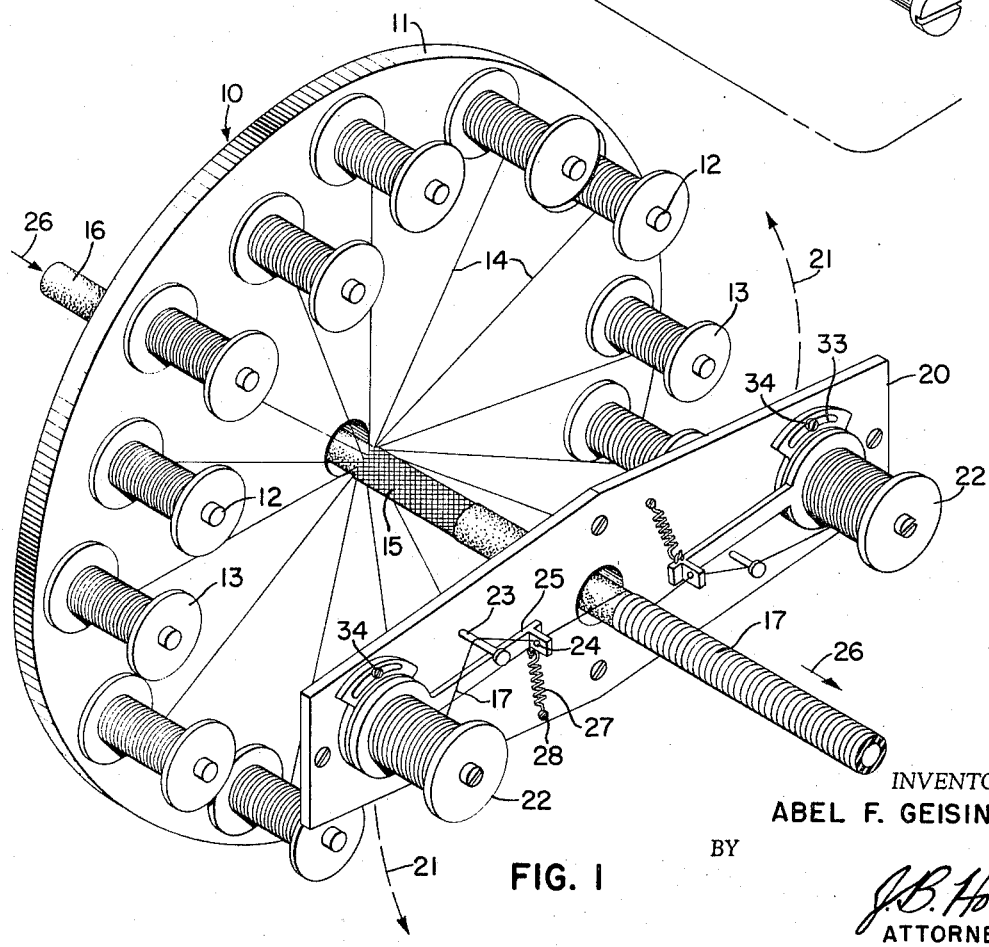
FIG. 1 is a perspective view of a hose wrapping and wire tensioning machine which includes the present invention.

A hose wrapping machine is shown generally at 10 in FIG. 1. The braiding mechanism 11 is of a type known to those skilled in the art and need not be specifically described in detail, except to point out that it includes a multiplicity of carriers 12 upon which are mounted spools 13. Spools 13 move in crossing undulating paths by an arrangement of for example horn gears and sinusoidal paths cut into mechanism 11 (not shown). The braiding mechanism 11 is very effective to interconnect a multiplicity of reinforcement strands 14 so as to form an outer braided jacket 15 which forms in this application the fibrous portion of the hose carcass. The braided layer or jacket 15 can be placed over an elastomeric unvulcanized hose such as 16 to form a reinforced hose structure capable of withstanding substantial internal pressures or vacuums.

In order to further reinforce hose 16, a steel wire reinforcement 17 is spiraled over the carcass of the hose. Since the performance of the hose, if it is of the rigid type, depends in part upon the uniformity of the spiraled wire, it is important to position each convolution of wire with the same amount of tension.

At 20, is shown a wire winding framework that is designed to revolve about hose carcass 16 as shown by arrows 21. For the purposes herein it will suffice to state that framework 20 is rotated by any conventional drive which results in a fairly constant angular velocity. Near the outer edges of framework 20 are spools 22 which contain strands of wire 17. The manner whereby constant tension in wires 17 is achieved can best be illustrated by reference to the left-hand side of framework 20. Wire 17 is removed tangentially from spool 22 and then passes over pin 23 which is firmly fixed to framework 20. From pin 23 wire 17 then passes through guide aperture 24 of brake assembly 25. Wire 17 then progresses to the surface of hose 16 which is being wrapped as it progresses in the axial direction of the hose as depicted by arrows 26. Attached to brake assembly 25 is spring 27 which is anchored to framework 20 by any convenient means such as screw 28.

The brake assembly 25 and its associated components can best be seen in FIG. 2 which shows an exploded view including wire spool 22 and its mounting bolt 29. Between the disc portion 30 of brake assembly 25 and framework 20 is positioned brake pad 31 which contains cam surfaces 32 which are circumferentially equally spaced around the central axis of bolt 29. Also shown is an adjustment slot 33 and clamp bolt 34 for adjusting brake pad 31. The side of disc portion 30 of brake assembly 25 that faces brake pad 31 also has inclined cam surfaces 35 that coincide with cam surfaces 32 of brake pad 31 when in the assembled position such as depicted in FIG. 1. A rubber or similar friction pad 36 is positioned between the outer surface of disc portion 30 and the back side of wire spool 22. Pad 36 resists angular rotation as between spool 22 and disc portion 30. The entire assembly as shown in FIG. 2 is held together and is attached to framework 20 by bolt 29 which threads into framework 20 (not shown).

In operation, as framework 20 is revolving about hose carcass 16, wire 17 is reeled off spool 22. As wire 17 becomes slack, spring 27 contracts thus moving brake assembly 25 (left-hand side) in a clockwise direction. The clockwise rotation of brake assembly 25 causes brake pad 31 and disc portion 30 of brake assembly 25 to move away from each other along the axial direction of bolt 29. This movement transmits a compressive force to spool 22 through friction pad 36 thus causing spool 22 to resist the turning action being induced by the removal of wire 17 therefrom. As the tension in wire 17 increases it will have a tendency to form a straight line between pin 23 and hose 16. The movement toward a straight line of wire 17 between pin 23 and hose 16 will cause spring 27 to elongate and also will cause brake assembly 25 to move in a counterclockwise direction. As brake assembly 25 moves in a counterclockwise direction, the compressive force applied in the axial direction to spool 22 will be decreased.

Thus it becomes apparent that by initially adjusting brake pad 31 by means of adjustment slot 33 and clamp bolt 34, any desired tension can be maintained in the apparatus. Only one-half of the tensioning apparatus has been explained in detail, the right-hand side as shown in the drawing works in a similar manner.

The constant tension wire wrapping device as heretofore described is not only applicable to the wrapping of hose, but also can be utilized for other objects such as wooden rods and metallic tubular objects.

While certain representative embodiments and details have been shown for the purpose of illustrating the invention, it will be apparent to those skilled in this art that various changes and modifications may be made therein without departing from the spirit or scope of the invention.

What is claimed is:

1. In a machine for spiral wrapping wire under tension onto a tubular hose member during the building operation, the combination of carrying means mounted for rotation about the hose member to support at least one spool of wire thereon as the hose member passes said carrying means and braking means positioned between said spool and said carrying means to maintain a substantially constant tension on said wire as it is wrapped on said hose, said braking means consisting of a first part mounted on said carrying means and a second part rotatably mounted adjacent said first part on the side opposite said carrying means, each of said first and second parts having engaging cam surfaces on their opposing faces so that relative rotation therebetween will change the axial distance between said first and second parts, an arm portion extending in a substantially radial direction from the edge of said second part toward said hose member and having means adjacent the outer end thereof to guide the wire as it is wrapped on the tubular member, means to resiliently rotationally urge said second part in a single angular direction with respect to said first member, wire training means attached to said carrying means over which the wire from said spool passes prior to its engagement with the guide means on said arm portion, said training means being positioned between said spool and guide means to cause the wire to follow an angular path between the spool and cylindrical member during the wrapping operation and friction means disposed between the opposed faces of said second part and said spool to control the tension on said wire by its frictional engagement therewith, the extent of the frictional engagement being directly related to the tension in the wire.

2. In a machine as set forth in claim 1 in which said first part is attached to said carrying means to provide means for adjusting the position thereof to control the amount of tension in the wire as it is wrapped on the hose.

3. In a machine as set forth in claim 1 in which said carrying means extends on opposite sides of said hose member and a braking means is attached to each end of said carrying means whereby two wires are simultaneously wrapped under tension onto said hose member.

References Cited
UNITED STATES PATENTS

| | | | |
|---|---|---|---|
| 1,937,918 | 12/1933 | Smith et al. | 242—75.43 X |
| 2,134,994 | 11/1938 | Zarafu | 57—3 |
| 2,208,963 | 7/1940 | Diehl | 57—10 |
| 2,214,315 | 9/1940 | Adamson | 242—105 X |
| 2,488,492 | 11/1949 | Dumbleton. | |
| 2,657,866 | 11/1953 | Lungstrom | 242—75.43 X |
| 2,906,472 | 9/1959 | Hannay et al. | 242—156.2 X |

FRANK J. COHEN, *Primary Examiner.*

W. S. BURDEN, *Examiner.*